April 16, 1963    A. L. MORLIK    3,085,285
ADJUSTABLE WHEELED ASSEMBLY
Filed Nov. 28, 1958    2 Sheets-Sheet 1
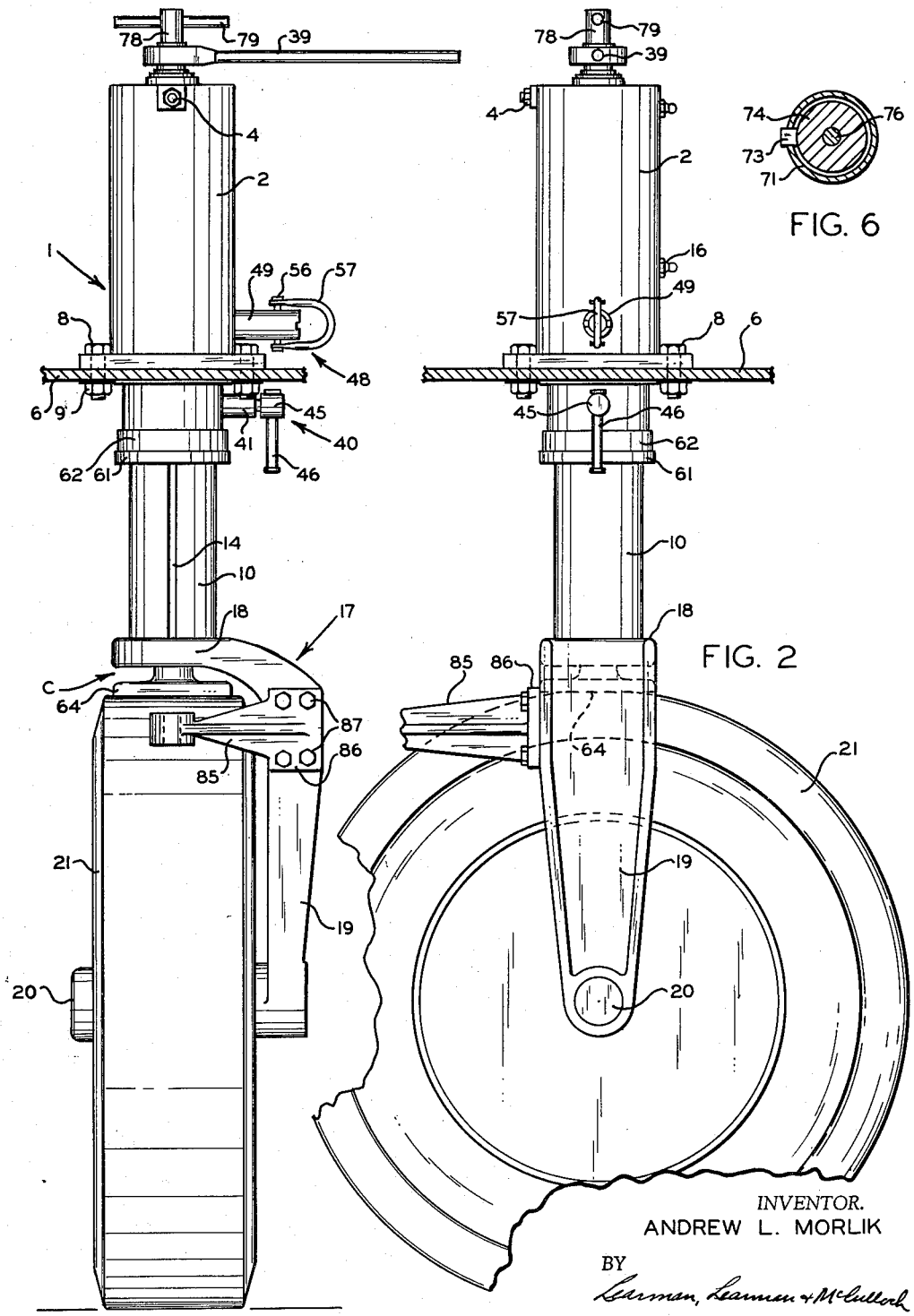
INVENTOR.
ANDREW L. MORLIK
BY
ATTORNEYS

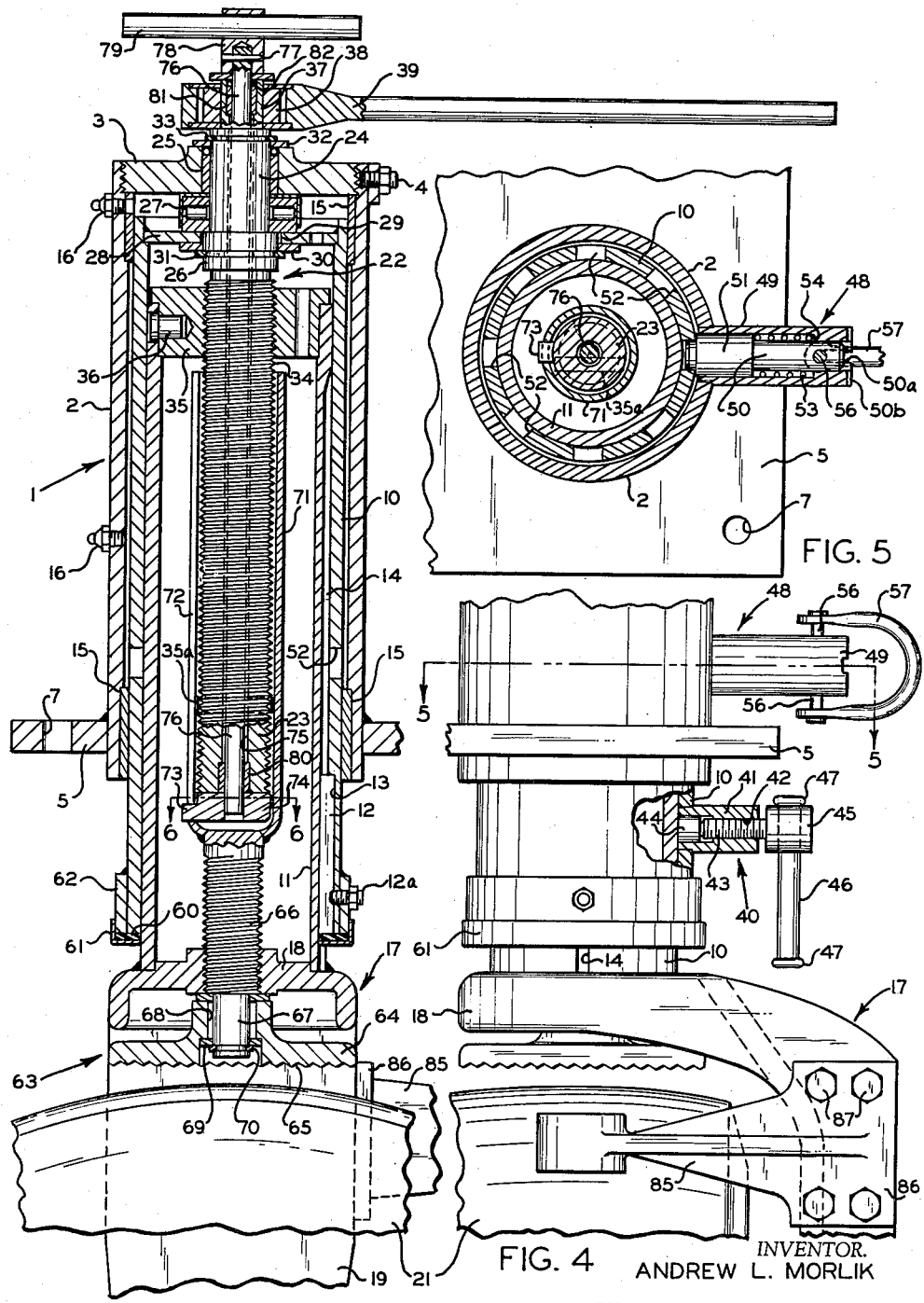

3,085,285
Patented Apr. 16, 1963

3,085,285
ADJUSTABLE WHEELED ASSEMBLY
Andrew L. Morlik, Saginaw, Mich., assignor to Saginaw Products Corporation, Saginaw, Mich., a corporation of Michigan
Filed Nov. 28, 1958, Ser. No. 776,867
7 Claims. (Cl. 16—35)

This invention relates to wheeled assemblies of the kind especially adapted for use on material handling trucks or platforms and more particularly the invention pertains to such wheel assemblies which are selectively swivelable, capable of vertical adjustment, and equipped with braking means for selectively enabling and disabling rotation of the wheels.

Scaffolding and material supporting platforms of various kinds used in aircraft maintenance operations and the like preferably are mounted on wheels so as to enable the platform to be towed to the site of its use. The wheels of the platform preferably should be capable of swiveling or castering movements to facilitate placement of the platform relative to the aircraft or other object to be worked upon. The wheels also should be provided with apparatus for locking them against rotation after the material handling platform has been placed in position, so as to prevent inadvertent movement of the platform in use. Moreover, it is desirable that the platform be vertically adjustable so as to permit the load carrying bed of the platform to be located at the most convenient height.

An object of this invention is to provide a wheeled assembly having all the attributes referred to above.

Another object of the invention is to provide a vertically adjustable, castering, wheel assembly having a brake for locking the wheel against rotation and in which the vertical adjusting means and the brake actuating means are located in a common area.

A further object of the invention is to provide a wheeled assembly of the kind referred to wherein the brake actuating mechanism is operable in all positions of vertical adjustment of the assembly.

Still a further object of the invention is to provide a castering assembly of the kind described wherein the swivelable wheel is capable of being locked against swiveling movements.

Another object of the invention is to provide a wheeled castering assembly wherein the operating parts are protected from the ravages of weather.

Still a further object of the invention is to provide a wheeled assembly of the kind described which is compact, light in weight, and rugged and durable in use.

Other objects and advantages of the invention will be pointed out specifically or will become apparent from the following description when it is considered in conjunction with the appended claims and the accompanying drawings, in which:

FIGURE 1 is an end elevational view of a wheel assembly formed in accordance with the invention;

FIGURE 2 is a fragmentary, side elevational view of the assembly shown in FIGURE 1;

FIGURE 3 is a vertical, sectional view of the assembly;

FIGURE 4 is a fragmentary, enlarged, partly sectional view of a portion of the apparatus;

FIGURE 5 is a sectional view taken on the line 5—5 of FIGURE 4; and

FIGURE 6 is a sectional view taken on the line 6—6 of FIGURE 3.

A wheeled assembly formed in accordance with the invention includes an outer housing 1 comprising a hollow, cylindrical tube 2 threaded at its upper end for reception of a correspondingly threaded end cap 3. The cap is retained against inadvertent removal by a set screw 4. Adjacent to its lower end, the housing 2 has welded thereto a mounting plate or bracket 5 by means of which the assembly may be connected to a mobile platform or scaffolding frame member 6. The plate 5 may be equipped with a plurality of openings 7 therein for the accommodation of bolts 8 which also may pass through openings formed in the frame member 6 and receive nuts 9 so as removably to mount the assembly on the mobile platform.

Concentrically received within the housing cylinder 2 is a cylindrical sleeve 10 and slideably mounted in the sleeve 10 is a concentric cylinder 11. The cylinder 11 is capable of extension and retraction relative to the sleeve 10, but is prevented from rotating relatively to the latter by means of a key 12 received in a slot 13 formed at the lower end of the sleeve 10 and projecting into a groove 14 provided in the side wall of the cylinder 11. The key is retained in place by a set screw 12a. The cylinders 10 and 11, as a unit, are rotatable within the housing 2 and for this purpose bearings 15 are provided adjacent to the upper and lower ends of the housing 2 between the latter and the sleeve 10. To lubricate the bearings, the housing 2 may be provided with a number of conventional fittings, two of which are shown in FIGURE 3 at 16.

The lower end of the innermost sleeve 11 is welded or otherwise suitably fixed to a wheel mounting bracket 17 including a substantially horizontal arm portion 18 from which extends a downwardly projecting arm portion 19, the lower end of the latter being fixed in any suitable manner to a substantially horizontal spindle 20 on which a rubber tired wheel 21 is journaled. The diameter of the wheel 21 is such that a clearance C will exist between the bracket arm 18 and the top of the wheel when the parts are assembled.

The apparatus includes adjusting means 22 for extending and retracting the wheel 21 relatively to the housing 2. The adjusting means 22 comprises an operating shaft 23 concentrically received within the innermost tube 11 and having a reduced neck portion 24 journaled in bearings 25 surrounding an opening formed in the housing cap 3. The neck 24 includes an annular enlargement or shoulder 26 spaced from the end cap 3 and on which is mounted a thrust bearing assembly 27 of known construction. The bearing assembly 27 also rests on a retaining plate 28 which is welded adjacent to the upper end of the intermediate sleeve 10, the plate 28 having a central opening 29 to accommodate the enlargement 26. The plate 28 bears against a washer 30 which surrounds the enlargement 26, the washer being maintained in snug engagement with the plate 28 by means of an annular retaining ring 31 received in a groove formed in the shoulder 26. A similar washer 32 surrounds the neck 24 of the shaft 23 and is maintained in snug engagement with the top of the end cap 3 by a similar retaining ring 33. The construction and arrangement of the shaft 23 and its associated parts described thus far are such that the shaft 23 and the intermediate sleeve 10 are restrained against movement longitudinally of the housing 2 but the shaft 23 is freely rotatable relatively to the housing 2 and the sleeves 10 and 11.

The operating shaft 23 is provided with screw threads 34 from a point adjacent to the shoulder 26 throughout the remainder of its length. The threaded portion of the shaft 23 extends through a correspondingly threaded nut member 35 which is located at the upper end of the innermost sleeve 11 and fixed to the latter by means of a number of retaining pins 36, one of which is shown in FIGURE 3. The arrangement is such that rotation of the operating shaft 23 will cause relative axial movement of the shaft 23 and the nut 35. Since the shaft 23 is restrained against longitudinal movement, the nut 35 will move axially along the shaft 23. Since the nut 35 is fixed to the sleeve 11, and since the latter is fixed to and forms a part of the wheel mounting bracket 17, rotation of the shaft 23 will cause extension or retraction of the wheel 21 relative to the housing 2, depending on the direction of rotation of the shaft 23. Extension of the sleeve 11 is limited by a stop pin 35a secured to and extending through the shaft 23 in a position to engage the nut 35.

Various means for effecting operation of the adjusting shaft 23 may be used. In the disclosed embodiment of the invention, the shaft 23 is provided with a reduced end portion 37 having a hexagonal or other configuration and which is received in correspondingly shaped socket 38 forming part of a known ratchet wrench 39. Other kinds of devices may be used, however, in place of the wrench 39.

The wheeled assembly preferably includes means for locking the wheel in a selected position of vertical adjustment and other means for locking the wheel against swiveling movement. The vertical adjustment locking means is represented by the reference character 40 in FIGURE 4 and comprises a hollow mounting member 41 fixed in an opening formed in the wall of the intermediate cylinder 10. The mounting member 41 has a threaded bore 42 therein through which extends a threaded screw 43 connected at one end to a brass or the like friction plug 44 which is adapted to bear against the innermost sleeve 11 of the assembly. The other end of the screw 43 is fixed to a head 45 through which slideably extends an operating lever 46 having enlargements 47 at both ends to prevent its inadvertent loss.

The antiswiveling means 48 comprises a hollow cylinder 49 fixed in an opening formed in the wall of the housing cylinder 2 and containing therein a reciprocable pin 50 havnig an enlarged, inner end 51 adapted to project into any one of a plurality of openings 52 formed in the intermediate cylinder 10. The locking pin 50 is urged towards its projected or locking position by a spring 53 reacting between the enlargement 51 and a shoulder 54 at the outer end of the cylinder 49. Fixed to the pin 50 and projecting through slots 50a formed in the member 49 is a pin 56 to which is connected an operating yoke 57 that may be manipulated manually to condition the wheel for swiveling movement or enable the spring 53 to project the locking pin to its antiswiveling position. The member 49 is equipped with a pair of notches 50b adapted to receive the pin 56 upon 90° rotation thereof and hold the locking pin 50 in retracted position to permit swiveling movements of the wheel.

Means is provided for preventing leakage of lubricant from between the cylinders 10 and 11 and for preventing the entry of water and dirt to the assembly during the extension and retraction of the cylinder 11. This means comprises a neoprene or the like seal 60 mounted in a cup-shaped ring 61 which is secured to a collar 62 that may be welded or otherwise suitably secured at the lower end of the intermediate cylinder 10. The arrangement is such that the seal 60 surrounds and engages the outer surface of the cylinder 11 and wipes the latter during extension and retraction thereof so as to preclude the leakage of lubricant from the assembly and prevent the entry of dirt and water to the interior of the assembly.

Apparatus constructed in accordance with the invention includes braking means 63 comprising a shoe or pad 64 located in the clearance C and having a roughened surface 65 adapted to be moved into and out of engagement with the periphery of the wheel 21. Vertically extensible and retractable means for effecting movements of the brake 64 are included and comprise a screw-threaded element 66 mounted concentrically within the innermost cylinder 11 and extending through a correspondingly threaded opening in the wheel mounting bracket 17. The lower end of the screw 66 extends through an opening 67 and is reduced as at 68 and is rotatably connected to the pad 64 by means of a washer 69 and a retaining ring 70. A similar washer 69a is interposed between the pad 64 and the body of the screw 66 so as to preclude relative axial movement of the parts 64 and 66.

The opposite, or upper, end of the screw element 66 is welded or otherwise suitably fixed to a hollow, tubular socket member 71 forming part of the brake actuating means and which is of such size as to receive the threaded portion of the vertical adjusting screw 23. The socket member 71 is provided with a longitudinally extending slot 72 which extends substantially the full length of the socket and in which is received a laterally projecting tang 73 formed on a washer-like element 74 which also is of such size as to be received within the socket 71.

As is best shown in FIGURES 3 and 5, the vertical adjusting screw 23 is hollow to provide a bore 75 extending from end to end of the shaft for reception of an actuating rod 76 which is sufficiently greater in length than the screw element 23 that the rod 76 projects beyond both ends of the screw element when the parts are assembled. The lower end of the rod 76 is welded or otherwise suitably fixed to the element 74 and the upper end of the rod 76 is made fast by means of a pin 77 or the like with a collar 78 through which extends an actuating handle 79. The actuating rod 76 is rotatable relatively to the height adjusting mechanism 22, and to prevent inadvertent rotation of the brake actuating mechanism during operation of the height adjusting mechanism, bearings 80, 81, and 82 are provided between the rod 76 and parts of the mechanism 22.

To condition the apparatus for use, a plurality of wheeled assemblies of the kind described thus far may be mounted on scaffolding, platforms, trucks, or the like so as to render them mobile. In some instances it may be desirable to permit the wheel of one or more of the assemblies to be steerable, so the wheel mounting bracket 17 preferably is so constructed as to accommodate a steering arm 85 having a flange 86 which may be secured to the bracket 17 by suitable means such as bolts 87. When the mobile platform or the like is fitted with the wheeled asesmblies, the platform may be moved to the site of its use and, if desired, the wheels 21 may be disabled from swiveling by operation of the anti-swiveling means 48. Thereafter, the brake-actuating mechanism may be operated to effect engagement between the brake pad 64 and the wheel 21 so as to immobilize the platform. If vertical adjustment of the platform or of any particular wheel assembly is required, the height-adjusting mechanism 22 may be operated by the wrench 39 or equivalent device to cause extension or retraction of the cylinders 11 on which the wheels are mounted. When the platform has been adjusted to the desired height, the locking means 40 may be manipulated to prevent inadvertent readjustment of the height-adjusting means.

No particular order of operation of the brake-actuating mechanism and the height-adjusting mechanism is required. Either mechanism may be operated independently of the other and, inasmuch as the parts 76—73, and 66 of the brake-adjusting mechanism are extensible relatively to one another, the brake-actuating mechanism is operable in all positions of adjustment of the cylinders 11 and 10, 2.

The disclosed embodiment is representative of a presently preferred form of the invention but is intended to be illustrative rather than definitive thereof. The invention is defined in the claims.

I claim:

1. An adjustable, wheeled assembly comprising a hollow mounting member adapted for connection to a part to be supported; a ground engageable wheel; wheel journaling means including a hollow member concentrically mounted on said mounting member for extension and retraction relative thereto; operating means concentric with said members and interconnecting said members for effecting relative extension and retraction thereof; brake means movable into and out of engagement with said wheel; and extensible and retractable actuating means concentric with said members and connected to said brake means for actuating the latter in all positions of adjustment of said members; said operating means comprising a screw element carried by one of said members and a nut element carried by the other of said members, said screw element being rotatable relatively to said nut element; said actuating means comprising a threaded part in threaded engagement with said journaling means and a socket element fast with said threaded part and receiving said screw element of said operating means; said screw element being hollow and said socket element having a longitudinally extending slot therein, and said actuating means including a rotatable actuator rod extending through said screw part and a key extending laterally from said rod through said slot in said socket element.

2. An adjustable, wheeled assembly for supporting a frame at varying levels comprising a housing adapted to be connected to the frame; a ground engaging wheel; wheel carrying means carrying said wheel; a first rotary operating shaft, restrained from axial movement relative to said housing and reacting with said wheel carrying means, operative to extend and retract the housing relative to the wheel carrying means and the wheel carried thereby; brake shoe means carried by said wheel carrying means; reactable means connecting to said brake shoe means and reactable with said wheel carrying means for moving said shoe means from a position out of engagement with said wheel to a position into engagement therewith; and a second rotary operating shaft connected with said reactable means and supported by said operating means, restrained from axial movement relative to said housing and coextending with said first shaft, operable independently of said first shaft to move said brake shoe means into and out of positions of engagement and disengagement with said wheel in various positions of relative extension of said housing and wheel carrying means.

3. An adjustable, wheeled assembly for supporting a frame at varying levels comprising a housing adapted to be connected to the frame; a ground engaging wheel; wheel carrying means carrying said wheel and including a support tube connected with said housing for relative extension and retraction therewith; a first tubular, rotary operating shaft, restrained from axial movement and within and concentric with said tube, reacting with said tube to extend and retract the latter and the wheel carried thereby relative to said housing; a brake shoe including a support shaft concentric with said tube adjustably carried by said wheel carrying means and movable therewith in said retraction and extension, said support shaft being relatively adjustable with said wheel carrying means to move said shoe from a position out of engagement with said wheel to a position into engagement therewith; a second rotary operating shaft, restrained from axial movement and within and concentric with said first shaft, rotatable independently thereof; and means interconnecting said second operating shaft and said support shaft for moving said brake shoe into and out of positions of engagement and disengagement with said wheel in positions of relative extension of said housing and wheel carrying means upon rotation of said second operating shaft.

4. The combination defined in claim 3 in which said support shaft includes a tubular portion concentrically receiving said operating shafts and said interconnecting means includes a key on said second operating shaft received in an axial slot provided in said tubular portion of the support shaft.

5. An adjustable, wheeled assembly for supporting a platform or the like and raising and lowering said platform to a desired level, comprising; housing means adapted to be connected to the platform; a ground engaging wheel; wheel carrying means mounting said wheel and connected with said housing means for relative extension and retraction of said housing means upwardly and downwardly to raise and lower said platform from one level to another; operating means, reacting between said wheel carrying means and housing means, operative to raise and lower the housing means and the platform relative to the ground engaging wheel; a brake shoe; reactable means connecting to said brake shoe means and reactable with said wheel carrying means for moving said shoe means into and out of engagement with said wheel, and means including a rotatable part connected with said reactable means and supported by said operating means received by and operating within said operating means, operable independently of said operating means for moving said brake shoe both into and out of positions of engagement and disengagement with said wheel when said housing means is in various positions of extension relative to said wheel as well as when it is in retracted position.

6. An adjustable, wheeled assembly for supporting a platform or the like and raising and lowering said platform to a desired level, comprising; housing means adapted to be connected to the platform; a ground engaging wheel; wheel carrying means mounting said wheel and connected with said housing means for relative extension and retraction of said housing means upwardly and downwardly to raise and lower said platform from one level to another; operating means, supported by said wheel carrying means, reacting between said wheel carrying means and housing means, operative to raise and lower the housing means and the platform relative to the ground engaging wheel; brake shoe means; means connecting to said brake shoe means and reactable with said wheel carrying means for moving said brake shoe means from a position out of engagement with said wheel to a position into braking engagement therewith; and actuating means, mounted to move upwardly and downwardly with said housing means and carried by the operating means and connected with said means for moving said brake shoe means and operable independently of said operating means, for actuating said brake shoe means both into and out of positions of engagement and disengagement with said wheel when said housing means is in various positions of extension relative to said wheel as well as when it is in retracted position.

7. An adjustable, wheeled assembly for supporting a platform or the like and raising and lowering said platform to a desired level, comprising; housing means adapted to be connected to the platform; a ground engaging wheel; wheel carrying means mounting said wheel and connected with said housing means for relative extension and retraction of said housing means upwardly and downwardly to raise and lower said platform from one level to another; operating means, supported by said wheel carrying means and reacting between said wheel carrying means and housing means, operative to raise and lower the housing means and the platform relative to the ground engaging wheel; a brake shoe; means connected thereto reactable with the wheel carrying means for moving said brake shoe from a position out of engagement with said wheel to a position into braking engagement therewith; and brake actuating means, carried by the operating means and connected with the means connected to the brake shoe, operable independently of said operating means, for moving said brake shoe both into and out of positions of engagement and disengagement with said wheel when said housing means is in various positions of extension relative to said wheel as well as when it is in retracted position.

References Cited in the file of this patent

UNITED STATES PATENTS

| | | |
|---|---|---|
| 745,803 | Edeline | Dec. 1, 1903 |
| 1,555,839 | Fries et al | Oct. 6, 1925 |
| 1,599,485 | Perin | Sept. 14, 1926 |
| 1,944,185 | Langer | Jan. 23, 1934 |
| 2,002,455 | Schwerin | May 21, 1935 |
| 2,158,546 | Lang et al. | May 16, 1936 |
| 2,262,288 | Klipstein et al. | Nov. 11, 1941 |
| 2,401,881 | Petsche | June 11, 1946 |

FOREIGN PATENTS

| | | |
|---|---|---|
| 108,912 | Sweden | Nov. 2, 1943 |